No. 670,233. Patented Mar. 19, 1901.
D. H. HOUSTON.
FOLDING PANORAMIC PHOTOGRAPHIC CAMERA.
(Application filed Oct. 26, 1900.)
(No Model.) 2 Sheets—Sheet 1.
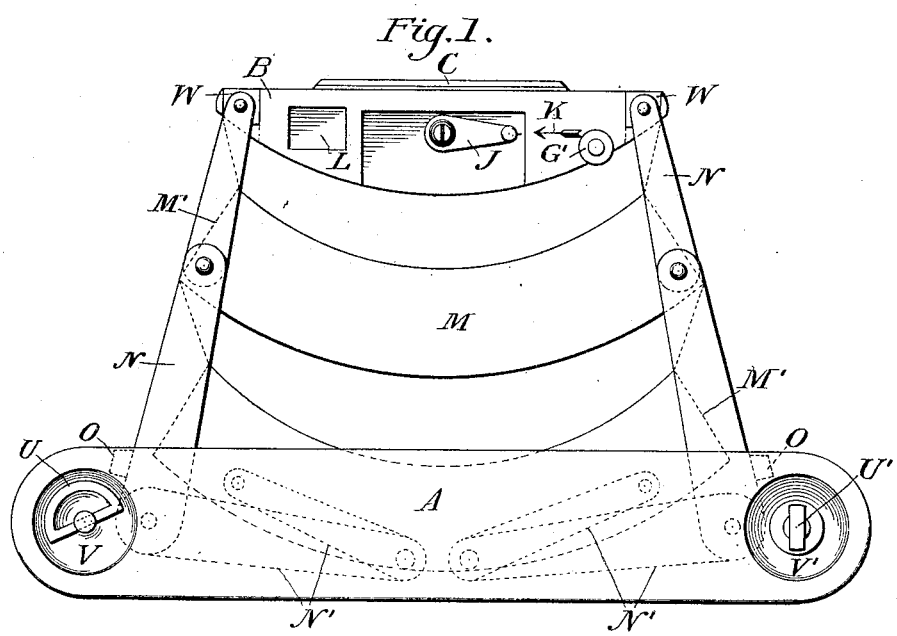
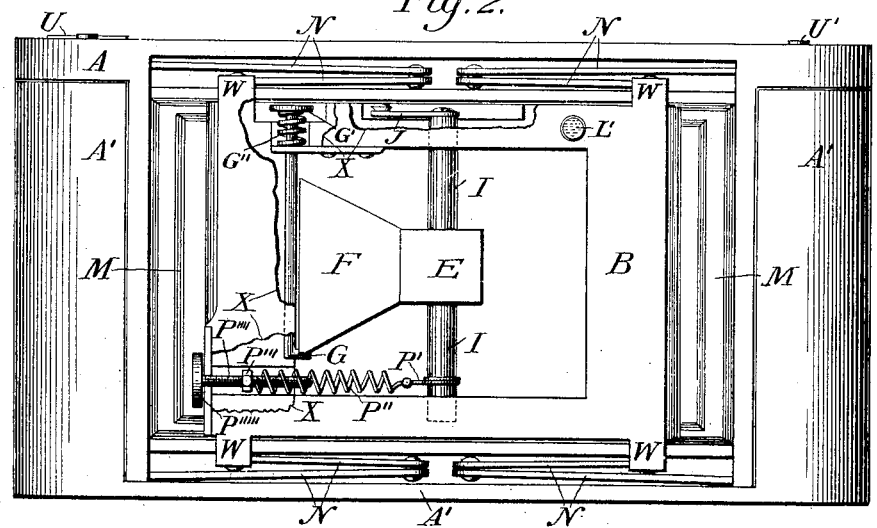
Witnesses
J H Gale
C. D. Field
Inventor
David Henderson Houston

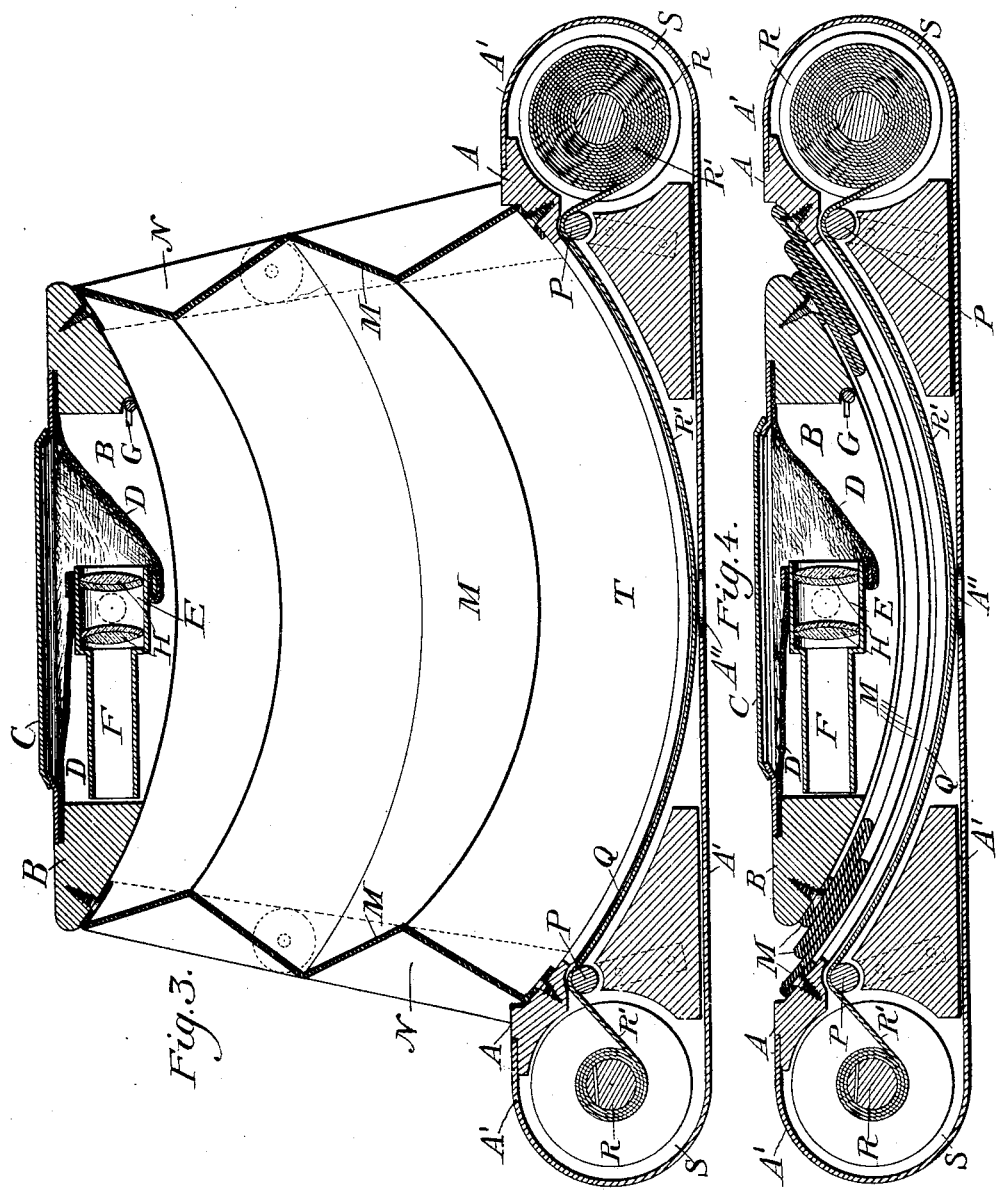

UNITED STATES PATENT OFFICE.

DAVID HENDERSON HOUSTON, OF HUNTER, NORTH DAKOTA.

FOLDING PANORAMIC PHOTOGRAPHIC CAMERA.

SPECIFICATION forming part of Letters Patent No. 670,233, dated March 19, 1901.

Application filed October 26, 1900. Serial No. 34,527. (No model.)

*To all whom it may concern:*

Be it known that I, DAVID HENDERSON HOUSTON, a citizen of the United States, residing at Hunter, in the county of Cass and State of North Dakota, have invented certain new and useful Improvements in Folding Panoramic Photographic Cameras; and I do hereby declare the following to be a full, clear, and exact description of the invention, such as will enable others skilled in the art to which it appertains to make and use the same.

My invention relates to photographic cameras, and has for its object the provision of a folding panoramic camera adapted to use the rolls of sensitized film, which are on the market and generally known as "film-cartridges," and which are adapted to be inserted into cameras in daylight.

The principal object of my invention is the provision of a folding panoramic camera of novel construction, having a box-front containing a pivoted lens, said box-front closing the outer end of the camera-bellows, which is attached at its inner end to the camera-case, said bellows and box-front being adapted to be projected out of and closed into the central concave front compartment of the camera-case and said box-front and bellows being supported upon an extensible supporting structure, which is adapted to be extended out of or folded into the camera-case.

My invention contains many features of construction which when combined with the basic elements of the invention make a very compact folding panoramic camera, which is well adapted to be carried in the pocket of the user and which in pocket size can be adapted to make a picture as large as three by six inches in size, including an angle of seventy-five degrees, when constructed as specified. Thus my invention economizes space and makes possible the production of larger-sized pictures in proportion to the outer dimensions of the camera, and the camera is still of easy pocketable size and shape.

My invention consists in novel features of construction and combination of parts, which are hereinafter described, and the novel features pointed out in the claims.

Figure 1 in the drawings is a top plan view of the camera, shown three-fourths of the full size, with the bellows and box-front projected forward. Fig. 2 in the drawings is a front view of the camera, shown three-fourths of the full size, with the box-front, lens, and bellows folded into the concave front compartment of the camera-case and with the flexible front of the camera not shown, so as to bring into view interior parts of the box-front of the camera. Fig. 3 in the drawings is a horizontal central sectional view taken lengthwise of the camera, with the bellows extended. Fig. 4 in the drawings is a horizontal central sectional view taken lengthwise of the camera, with the bellows, box-front, and lens folded into the central concave front compartment of the camera.

In the drawings, in which letters of reference denote corresponding parts in all of the figures, at A is represented the camera-case; at A', the removable back and ends of the camera-case; at A'', the observation-aperture in the back of the camera-case; at B, the movable box-front of the camera; at C, the outer opening protective front; at D, the inner flexible front; at E, the pivoted lens-mount; at F, the rearward extension of the pivoted lens-mount; at G, the catch to hold the extension of the lens-mount when it is swung in opposition to the pressure of a spring; at G', the touch-button; at G'', the spring to hold the touch-button up to place; at H, the lens; at I, the pivot upon which the lens-mount swings; at J, the set-lever; at L, the finder; at L', the finder-lens; at M, the bellows; at M', the dotted lines, showing the position of the bellows; at N, the extensible supports for supporting the camera-front; at N', the dotted lines, showing the position of the extensible supports when they are folded into the camera-case; at O, the dotted lines, showing stops which regulate the positions of the extensible supports when they are extended; at P, the rounded guides for the sensitized film.

At Q is shown the lower one of the circularly-positioned guides for the sensitized film; at R, the spools; at R', the sensitized film; at S, the outer compartments for holding the reel-spool and supply-spool; at T, the concave central front compartment; at U, the thumb-piece of the reel-center, and at U' the outer end of the spool-center.

At V is shown a depression in the camera-case, which allows the outer end of the reel-center to lie below the general surface of the camera-case and the thumb-piece to fold into the said depression.

At V' is also shown a depression in the camera-case, which allows the spool-center to lie below the general surface of the camera-case.

At W are shown four extensions of the camera-front, to which the outer ends of the extensible supports are connected.

At X are pointed out the uneven lines by which are shown the cutting away of portions of the drawings, so as to bring into view the set-lever, the touch-button, and the catch for holding the extension of the lens-mount, and the spring connected to the nut through which a tension-screw passes At P is shown a cord passed around the pivot-post I, which cord is attached to a spring P'', having a nut P''', through which nut a tension-screw P'''' passes, said tension-screw having a thumb-head P''''', and as the aperture through which the nut passes is made square and the nut square it follows that in turning the tension-screw the nut will not turn, but will be moved forward or backward, as the case may be, and the spring tension increased or decreased by the operator to increase or decrease the speed of rotation of the pivot-post and the lens pivoted thereon.

In preparing the camera for use the operator removes the back of the camera and inserts a spool cartridge or film into the spool side of the camera and passes the loose end of the paper wrapper of the film forward and over the guide-roller, thence forward and behind circularly-positioned guides, and thence forward and over the opposite guide-roller and attaches the end of the paper wrapper to the reel-spool. Then by winding the reel the end of the wrapper of the sensitized film will be wound around the reel. Then the back should be replaced and the wrapper of the film wound forward until the first number on the back of the wrapper comes opposite to the observation-aperture in the back of the camera. The camera is then ready for use.

The camera is used as follows: Project the box-front of the camera as shown in Fig. 1. Next set the set-lever to point to the arrow-mark, and the catch will hold the extension of the lens-mount rotated in opposition to the motor-spring connected to the pivot-post. Next open the protective front, and having pointed the camera to the view and holding the camera level and steady then press the touch-button, which will release the catch and liberate the lens-mount and the lens therein to revolve by the power of the motor-spring, and during the revolution of the lens upon its focal axis the light from the view will be passed to the circularly-positioned sensitized film in the camera, and a latent impression from the view will be made. Next close the protective front, and then fold the box-front and the bellows into the camera-case.

Having described my invention, I claim—

1. In a panoramic photographic camera, the combination with a suitable casing, of a bellows attached at its rear end to said casing, a box-front attached to and closing the front end of said bellows, a lens pivoted in said box-front, circularly-positioned film-guides in said casing, and means for projecting said box-front to a position where the lens will focus upon a sensitized film held upon the circularly-positioned guides.

2. In a panoramic photographic camera, the combination with a suitable casing, of a bellows attached at its rear end to the interior of said casing, a box-front attached to and closing the front end of said bellows, a lens pivoted in said box-front, means, carried by said box-front, for swinging said lens on its pivot, an extensible supporting structure connected to the box-front and to the interior of said casing, said box-front and the parts carried thereby, said bellows, and said supporting structure being adapted to close into said camera-casing, means for controlling the extent of projection of the lens when the bellows is extended, circularly-positioned guides for the sensitized film located in said casing and adapted to hold the film in the focus of said lens during its swinging movement, rounded guides for the film approximately adjacent to the ends of said circularly-positioned guides, and spool and reel devices placed in the end spaces of the casing.

3. In a panoramic photographic camera, the combination with a suitable casing, of a bellows attached at its rear end to the interior of said casing, a box-front attached to and closing the front end of said bellows, a lens pivoted in said box-front, folding supports pivoted to said box-front and to the interior of said casing, said folding supports being jointed to bend and allow said supports, said bellows, and said box-front, together with parts carried thereby, to all fold into the interior of said casing, and means for controlling the extent of projection of the lens when the bellows is extended.

4. In a panoramic photographic camera, the combination with a suitable casing, of a bellows attached at its rear end to the interior of said casing, a box-front attached to and closing the front end of said bellows, a lens pivoted in said box-front, folding supports pivoted to said box-front and to the interior of said casing, said folding supports being jointed to bend and allow said supports, said bellows, and said box-front, together with parts carried thereby, to all fold into the interior of said casing, and stops on said camera-casing adapted to regulate the adjustment of said folding supports to the proper position to support the box-front in a position wherein the lens will be in focus upon the sensitized film.

In testimony whereof I affix my signature in presence of two witnesses.

DAVID HENDERSON HOUSTON.

Witnesses:
J. H. GALE,
C. D. FIELD.